(12) United States Patent
Natsuyama et al.

(10) Patent No.: US 7,989,542 B2
(45) Date of Patent: Aug. 2, 2011

(54) PROCESS FOR PRODUCING THERMOPLASTIC ELASTOMER COMPOSITION, AND PROCESS FOR PRODUCING FOAMED THERMOPLASTIC ELASTOMER COMPOSITION

(75) Inventors: Nobuhiro Natsuyama, Ichihara (JP); Hironobu Shigematsu, Kobe (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1174 days.

(21) Appl. No.: 11/294,305

(22) Filed: Dec. 5, 2005

(65) Prior Publication Data

US 2006/0211812 A1 Sep. 21, 2006

(30) Foreign Application Priority Data

Mar. 16, 2005 (JP) ................. 2005-074728

(51) Int. Cl.
*C08L 23/00* (2006.01)
(52) U.S. Cl. ................. 524/528; 524/505; 521/134
(58) Field of Classification Search .......... 524/528, 524/505
See application file for complete search history.

(56) References Cited

U.S. PATENT DOCUMENTS

| | | |
|---|---|---|
| 5,552,482 A | 9/1996 | Berta |
| 5,728,744 A | 3/1998 | Okada et al. |
| 6,765,052 B2 * | 7/2004 | Shin et al. ............ 524/515 |
| 2001/0018475 A1 | 8/2001 | Tominaga et al. |
| 2002/0183441 A1 * | 12/2002 | Morikawa et al. ...... 524/525 |

FOREIGN PATENT DOCUMENTS

| | | |
|---|---|---|
| CN | 1158340 A | 9/1997 |
| EP | 0 930 337 A2 | 7/1999 |
| JP | 9-118795 A | 5/1997 |
| JP | 11-269325 A | 10/1999 |
| JP | 2001-123027 A | 9/2001 |
| WO | WO 02/059194 A2 | 8/2002 |

OTHER PUBLICATIONS

Chinese Office Action from the Chinese Patent Office dated Nov. 27, 2009.

* cited by examiner

*Primary Examiner* — Peter D Mulcahy
(74) *Attorney, Agent, or Firm* — Panitch Schwarze Belisario & Nadel LLP

(57) ABSTRACT

A process for producing a thermoplastic elastomer composition comprising the steps of (1) heating dynamically (A) a defined ethylene-α-olefin random copolymer rubber, (B) a propylene homopolymer, or a defined copolymer of propylene with ethylene and/or an α-olefin, (C) a mineral oil softener, and (D) a crosslinking agent, and (2) melt-kneading the resultant product with a defined polypropylene resin (E); and a process for producing a foamed thermoplastic elastomer composition comprising the further step of melt-kneading said thermoplastic elastomer composition with (F) a foaming agent.

6 Claims, No Drawings

PROCESS FOR PRODUCING THERMOPLASTIC ELASTOMER COMPOSITION, AND PROCESS FOR PRODUCING FOAMED THERMOPLASTIC ELASTOMER COMPOSITION

FIELD OF THE INVENTION

The present invention relates to a process for producing a thermoplastic elastomer composition, and a process for producing a foamed thermoplastic elastomer composition.

BACKGROUND OF THE INVENTION

JP 9-118795 A, which corresponds to U.S. Pat. No. 5,552,482A, discloses a blend of a partially dynamically vulcanized or crosslinked thermoplastic polyolefin elastomer with an uncrosslinked olefin polymer, the blend having an improved extrusion performance, wherein the uncrosslinked olefin polymer is selected from the group consisting of:

(1) a heterophasic olefin composition prepared by polymerization in at least two stages comprising (a) 10 to 50% by weight of a propylene homopolymer or a propylene copolymer, (b) 5 to 20% by weight of a semicrystalline, essentially linear ethylene copolymer fraction, and (c) 40 to 80% by weight of an ethylene copolymer fraction that is soluble in xylene at ambient temperature;

(2) a crystalline butane-1 homopolymer; and (3) a substantially amorphous ethylene/propylene or ethylene/butylene copolymer, or a substantially amorphous terpolymer of (a) ethylene, (b) propylene or butylene, and (c) a non-conjugated diene.

SUMMARY OF THE INVENTION

However, the above-mentioned blend of a partially dynamically vulcanized or crosslinked thermoplastic polyolefin elastomer with an uncrosslinked olefin polymer has a problem in that said blend attaches a large amount of a polymer to a vicinity of an outlet of a die equipped on an extruder in its extrusion-molding, which results in a poor appearance of an extrusion-molded article obtained.

In view of the above-mentioned problem in the conventional art, the present invention has an object to provide a process for producing a thermoplastic elastomer composition, and a process for producing a foamed thermoplastic elastomer composition, which attach only a small amount of a polymer to a vicinity of an outlet of a die equipped on an extruder in their extrusion-molding, and therefore, which can produce an extrusion-molded article having an excellent appearance.

The present invention is a process for producing a thermoplastic elastomer composition, which comprises the step of heating dynamically at least the following components (A), (C), (D) and (E):

(A) 100 parts by weight of an ethylene-α-olefin random copolymer rubber, which contains at least an ethylene unit and an α-olefin unit having 3 to 10 carbon atoms, and has hardness-A defined in JIS K-6253 of 98 or smaller;

(C) 5 to 150 parts by weight of a mineral oil softener;

(D) 0.01 to 20 parts by weight of a crosslinking agent; and (E) 5 to 130 parts by weight of a polypropylene resin, which contains 0.05 to 25% by weight of the following first propylene polymer component (E1) and 75 to 99.95% by weight of the following second propylene polymer component (E2), and has an intrinsic viscosity of 0.5 to 4 dl/g and a molecular weight distribution of 1 to 10, wherein the total amount of the first propylene polymer component (E1) and the second propylene polymer component (E2) is 100% by weight:

(E1) a first propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 5 to 10 dl/g, wherein the total amount of those units is 100% by weight; and (E2) a second propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 0.5 to 4 dl/g, wherein the total amount of those units is 100% by weight.

This process is hereinafter referred to as process 1.

Also, the present invention is a process for producing a foamed thermoplastic elastomer composition, which comprises the steps of:

(1) heating dynamically at least the following components (A), (C), (D) and (E), thereby producing a thermoplastic elastomer composition:

(A) 100 parts by weight of an ethylene-α-olefin random copolymer rubber, which contains at least an ethylene unit and an α-olefin unit having 3 to 10 carbon atoms, and has hardness-A defined in JIS K-6253 of 98 or smaller;

(C) 5 to 150 parts by weight of a mineral oil softener;

(D) 0.01 to 20 parts by weight of a crosslinking agent; and (E) 5 to 130 parts by weight of a polypropylene resin, which contains 0.05 to 25% by weight of the following first propylene polymer component (E1) and 75 to 99.95% by weight of the following second propylene polymer component (E2), and has an intrinsic viscosity of 0.5 to 4 dl/g and a molecular weight distribution of 1 to 10, wherein the total amount of the first propylene polymer component (E1) and the second propylene polymer component (E2) is 100% by weight:

(E1) a first propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 5 to 10 dl/g, wherein the total amount of those units is 100% by weight; and (E2) a second propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 0.5 to 4 dl/g, wherein the total amount of those units is 100% by weight; and (2) melt-kneading at least said thermoplastic elastomer composition with (F) 0.5 to 20 parts by weight of a foaming agent.

This process is hereinafter referred to as process-2.

Further, the present invention is a process for producing a thermoplastic elastomer composition, which comprises the steps of:

(1) heating dynamically at least the following components (A), (B), (C) and (D), thereby producing an intermediate product:

(A) 100 parts by weight of an ethylene-α-olefin random copolymer rubber, which contains at least an ethylene unit and an α-olefin unit having 3 to 10 carbon atoms, and has hardness-A defined in JIS K-6253 of 98 or smaller;

(B) 5 to 130 parts by weight of a propylene homopolymer, or a random or block copolymer of propylene with ethylene and/or an α-olefin having 4 to 10 carbon atoms, said homopolymer and said copolymer containing 50 to 100% by weight of a propylene unit, wherein the total amount of all units contained therein is 100% by weight;

(C) 5 to 150 parts by weight of a mineral oil softener; and (D) 0.01 to 20 parts by weight of a crosslinking agent; and (2) melt-kneading at least said intermediate product with 1 to 50 parts by weight of a polypropylene resin (E), which contains 0.05 to 25% by weight of the following first propylene polymer component (E1) and 75 to 99.95% by weight of the following second propylene polymer component (E2), and has an intrinsic viscosity of 0.5 to 4 dl/g and a molecular weight distribution of 1 to 10, wherein the total amount of the first propylene polymer component (E1) and the second propylene polymer component (E2) is 100% by weight:

(E1) a first propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 5 to 10 dl/g, wherein the total amount of those units is 100% by weight; and (E2) a second propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 0.5 to 4 dl/g, wherein the total amount of those units is 100% by weight.

This process is hereinafter referred to as process-3.

Still further, the present invention is a process for producing a foamed thermoplastic elastomer composition, which comprises the steps of:

(1) heating dynamically at least the following components (A), (B), (C) and (D), thereby producing an intermediate product:

(A) 100 parts by weight of an ethylene-α-olefin random copolymer rubber, which contains at least an ethylene unit and an α-olefin unit having 3 to 10 carbon atoms, and has hardness-A defined in JIS K-6253 of 98 or smaller;

(B) 5 to 130 parts by weight of a propylene homopolymer, or a random or block copolymer of propylene with ethylene and/or an α-olefin having 4 to 10 carbon atoms, said homopolymer and said copolymer containing 50 to 100% by weight of a propylene unit, wherein the total amount of all units contained therein is 100% by weight;

(C) 5 to 150 parts by weight of a mineral oil softener; and (D) 0.01 to 20 parts by weight of a crosslinking agent;

(2) melt-kneading at least said intermediate product with 1 to 50 parts by weight of a polypropylene resin (E), which contains 0.05 to 25% by weight of the following first propylene polymer component (E1) and 75 to 99.95% by weight of the following second propylene polymer component (E2), and has an intrinsic viscosity of 0.5 to 4 dl/g and a molecular weight distribution of 1 to 10, wherein the total amount of the first propylene polymer component (E1) and the second propylene polymer component (E2) is 100% by weight:

(E1) a first propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 5 to 10 dl/g, wherein the total amount of those units is 100% by weight; and (E2) a second propylene polymer component, which contains, at least, 50 to 100% by weight of a propylene unit and 0 to 50% by weight of an ethylene unit and/or an α-olefin unit having 4 to 12 carbon atoms, and has an intrinsic viscosity of 0.5 to 4 dl/g, wherein the total amount of those units is 100% by weight; thereby producing a thermoplastic elastomer composition; and (3) melt-kneading at least said thermoplastic elastomer composition with (F) 0.5 to 20 parts by weight of a foaming agent.

This process is hereinafter referred to as process-4.

DETAILED DESCRIPTION OF THE INVENTION

The component (A) is an ethylene-α-olefin random copolymer rubber, which contains at least an ethylene unit and an α-olefin unit having 3 to 10 carbon atoms, and has hardness-A defined in JIS K-6253 of 98 or smaller. The term "unit" in the present invention means a unit of a polymerized monomer. For example, the above-mentioned "ethylene unit" means a unit of a polymerized ethylene, $—CH_2—CH_2—$. The above-mentioned "JIS" means Japanese Industrial Standards.

Examples of the above-mentioned α-olefin are propylene, 1-butene, 2-methylpropylene, 1-pentene, 3-methyl-1-butene, 1-hexene, 4-methyl-1-pentene, and 1-octene; and a combination of two or more thereof. Among them, preferred is propylene or 1-butene, and more preferred is propylene, in view of availability.

The component (A) may contain other monomer unit than the ethylene unit and the α-olefin unit having 3 to 10 carbon atoms. Examples of the other monomer are a conjugated diene having 4 to 8 carbon atoms such as 1,3-butadiene, 2-methyl-1,3-butadiene (isoprene), 1,3-pentadiene, and 2,3-dimethyl-1,3-butadiene; a non-conjugated diene having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; a vinyl ester compound such as vinyl acetate; an unsaturated carboxylic acid ester such as methyl acrylate, ethyl acrylate, butyl acrylate, methyl methacrylate, and ethyl methacrylate; and an unsaturated carboxylic acid such as acrylic acid and methacrylic acid; and a combination of two or more thereof. Among the non-conjugated dienes, preferred is 5-ethylidene-2-norbornene or dicyclopentadiene, in view of availability.

The component (A) contains an ethylene unit in an amount of generally 30 to 90% by weight, and preferably 40 to 80% by weight; an α-olefin unit in an amount of generally 5 to 70% by weight, and preferably 15 to 60% by weight; and other monomer unit in an amount of generally 0 to 30% by weight and preferably 0 to 20% by weight, wherein the total amount of those units is 100% by weight.

The component (A) can be produced according to a process known in the art. Examples of the component (A) are an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, an ethylene-propylene-5-ethylidene-2-norbornene copolymer, an ethylene-propylene-dicyclopentadiene copolymer, an ethylene-propylene-1,4-hexadiene copolymer, and an ethylene-propylene-5-vinyl-2-norbornene copolymer; and a combination of two or more thereof. Among them, preferred is an ethylene-propylene copolymer containing an ethylene unit in an amount of 45 to 80% by weight, and a propylene unit in an amount of 20 to 55% by weight, the total amount of both units being 100% by weight, or an ethylene-propylene-5-ethylidene-2-norbornene copolymer, containing an ethylene unit in an amount of 40 to 80% by weight, a propylene unit in an amount of 15 to 55% by weight, and a 5-ethylidene-2-norbornene unit in an amount of 2 to 10% by weight, the total amount of those units being 100% by weight.

The component (A) has a Mooney viscosity ($ML_{1+4}$ 100° C.) of preferably 10 to 350, and more preferably 30 to 300. The Mooney viscosity of smaller than 10 may result in poor mechanical strength of a thermoplastic elastomer composition produced. The Mooney viscosity of larger than 350 may result in poor appearance of a thermoplastic elastomer composition produced.

The component (A) has an intrinsic viscosity of preferably 0.5 to 8.0 dl/g, and more preferably 1.0 to 6.0 dl/g, measured at 135° C. in tetrahydronaphthalene. The intrinsic viscosity of smaller than 0.5 dl/g may result in poor mechanical strength of a thermoplastic elastomer composition produced. The intrinsic viscosity of larger than 8.0 dl/g may result in poor appearance of a thermoplastic elastomer composition produced.

The component (B) is a propylene homopolymer, or a random or block copolymer of propylene with ethylene and/or an α-olefin having 4 to 10 carbon atoms (for example, 1-butene, 1-hexene, 1-pentene, 1-octene and 4-methyl-1-pentene), said homopolymer and said copolymer containing a propylene unit in an amount of 50 to 100% by weight, and preferably 80 to 100% by weight, wherein the total amount of all units contained therein is 100% by weight.

Examples of the above-mentioned copolymer as the component (B) are an ethylene-propylene copolymer, a propylene-1-butene copolymer, a propylene-1-hexene copolymer, a propylene-1-octene copolymer, a propylene-ethylene-1-butene copolymer, and an ethylene-propylene-1-hexene copolymer. As the component (B), a propylene homopolymer, an ethylene-propylene copolymer or 0a propylene-1-butene copolymer is preferable.

For instance, to take an illustration of a polymer produced by use of ethylene and propylene, the above-mentioned block copolymer as the component (B) means a polymer produced according to a process comprising the steps of:

(1) homopolymerizing propylene, thereby producing a propylene homopolymer (namely, polypropylene); and (2) copolymerizing propylene and ethylene in the presence of said propylene homopolymer.

The polymer produced according to the above-mentioned process is not a block copolymer consisting of a block of the propylene homopolymer produced in the step (1) and another block of the propylene-ethylene copolymer produced in the step (2), but substantially a polymer blend consisting of the propylene homopolymer produced in the step (1) and the propylene-ethylene copolymer produced in the step (2); namely, the polymer produced according to the above-mentioned process is not a block copolymer such as a styrene-butadiene block copolymer, SSS - - - SSSBBB - - - BBB (S is a styrene unit, SSS - - - SSS is a styrene block, B is a butadiene unit, and BBB - - - BBB is a butadiene block), which is a typical block copolymer exemplified in a polymer textbook. The reason why a polymer produced according to the above-mentioned process is usually called a block copolymer by those skilled in the art may be that the process comprises multiple steps such as two steps contained in the above-exemplified process.

The component (B) can be produced according to a process known in the art. The component (B) is not particularly limited in its stereoregularity. Examples of the stereoregularity are isotacticity, syndiotacticity, and a combination thereof. Among them, preferred is a homopolymer or a copolymer having mainly isotacticity.

The component (B) has a melt flow rate of preferably 0.1 to 100 g/10 minutes, and more preferably 0.5 to 50 g/10 minutes measured according to a method defined in JIS K-6758 at 230° C. under a load of 21.18 N.

An example of the component (C) is a high-boiling point fraction of petroleum, which fraction has an average molecular weight of 300 to 1500 and a fluid point of 0° C. or lower, such as aromatic mineral oil, naphthenic mineral oil, and paraffinic mineral oil. Among them, preferred is paraffinic mineral oil. The component (C) can be combined with the component (A). When the component (C) is used in combination with a rubber such as the component (A), the component (C) is called an extender or extender oil, and said combination is called an extended rubber or oil-extended rubber in the field of a rubber industry.

Examples of a process known in the art for combining the component (C) with the component (A) are (1) a process comprising the step of kneading mechanically both components with a kneading apparatus such as a roll and a Banbury mixer, and (2) a process comprising the steps of (i) adding the component (C) to a solution containing the component (A), the solution being obtained in the production step of the component (A), and then (ii) removing a solvent contained in the solution according to a method such as a steam-stripping method.

The component (D) may be a cross-linking agent conventionally used for cross-linking a rubber. Examples of the component (D) are an organic peroxide, a phenol resin, sulfur, a sulfur-containing compound, p-quinone, a derivative of p-quinone dioxime, a bismaleimide compound, an epoxy compound, a silane compound, and an amino resin. Among them, preferred is an organic peroxide or a phenol resin.

Examples of the organic peroxide as the component (D) are dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide, and tert-butyl peroxide. Among them, preferred is 2,5-dimethyl-2,5-di(tert-butylperoxy)hexyne-3, 2,5-dimethyl-2,5-di(tert-butylperoxy)hexane or 1,3-bis(tert-butylperoxyisopropyl)benzene, and particularly preferred is 2,5-dimethyl-2,5-di(tert-butylperoxy)hexyne-3 having a high decomposition temperature.

The component (D) is used in an amount of 0.01 to 20 parts by weight, and preferably 0.05 to 10 parts by weight, per 100 parts by weight of the component (A). The amount of smaller than 0.01 part by weight may result in poor elastic recovery of a thermoplastic elastomer composition produced. The amount of larger than 20 parts by weight may result in poor flexibility thereof.

The organic peroxide as the component (D) may be combined with a cross-linking auxiliary agent in order to have a homogeneous and mild cross-linking reaction. Examples of the cross-linking auxiliary agent are sulfur, p-quinone dioxime, p,p'-dibenzoylquinone dioxime, ethyleneglycol dimethacrylate, diethyleneglycol dimethacrylate, triethyleneglycol dimethacrylate, tetraethyleneglycol dimethacrylate, polyethyleneglycol dimethacrylate, trimethylolpropane trimethacrylate, diallyl phthalate, tetraallyloxyethane, triallyl isocyanurate, N,N'-m-phenylenebismaleimide, maleic anhydride, divinylbenzene, zinc diacrylate, and zinc dimethacrylate. Among them, preferred is N,N'-m-phenylenebismaleimide, p,p'-dibenzoylquinone dioxime, divinylbenzene, trimethylolpropane trimethacrylate or triallyl isocyanurate. N,N'-m-phenylenebismaleimide per se can be used as a cross-linking agent.

The cross-linking auxiliary agent is used in an amount of 0.01 to 10 parts by weight, and preferably 0.05 to 5 parts by weight, per 100 parts by weight of the component (A). The amount of smaller than 0.01 part by weight may result in an insufficient cross-linking efficiency. The amount of larger than 10 parts by weight may result in poor flexibility and mechanical properties of a thermoplastic elastomer composition produced.

An example of the above-mentioned phenol resin as the component (D) is a resin represented by the following formula (U.S. Pat. Nos. 3,287,440 and 3,709,840), which is conventionally used for cross-linking a rubber:

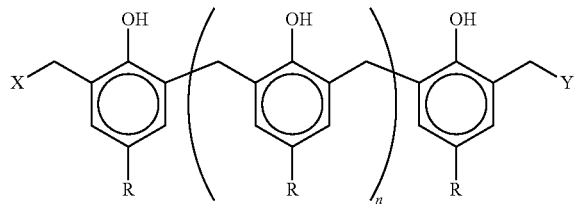

wherein R is a saturated hydrocarbon group having 1 to 15 carbon atoms; each of X and Y is a hydroxyl group, a halogenated alkyl group, or a halogen atom independently of each other; and n is an integer of 0 to 10. Said resin can be produced according to a process comprising the step of condensation-polymerizing a substituent-carrying phenol and an aldehyde with an alkali catalyst.

Further examples of the above-mentioned phenol resin as the component (D) are an alkylphenol-formaldehyde resin and a brominated alkylphenol-formaldehyde resin.

The phenol resin as the component (D) may be combined with a cross-linking auxiliary agent in order to regulate a cross-linking reaction rate. Examples of the cross-linking auxiliary agent are a metal halide such as stannous chloride and ferric chloride; and a halogenated polymer such as a chlorinated polypropylene, a brominated butyl rubber, and a chloroprene rubber.

The phenol resin as the component (D) is preferably combined with a dispersing agent such as a metal oxide (for example, zinc oxide) and stearic acid.

The "first propylene polymer component" as the component (E1) means a polymer component containing, at least, 50 to 100% by weight of a propylene unit and 0 to 50% by weight of an ethylene unit and/or an α-olefin unit having 4 to 12 carbon atoms, the total amount of those units being 100% by weight. The component (E1) is preferably a homopolymer of propylene. Examples of the above-mentioned α-olefin are 1-butene, 4-methylpentene-1,1-hexene, and 1-octene. Among them, preferred is 1-butene.

The component (E1) has an intrinsic viscosity of 5 to 10 dl/g, preferably 6 to 10 dl/g, and more preferably 7 to 10 dl/g. The intrinsic viscosity of smaller than 5 dl/g may result in deterioration of an appearance of a thermoplastic elastomer composition produced.

The "second propylene polymer component" as the component (E2) means a polymer component containing at least 50 to 100% by weight of a propylene unit and 0 to 50% by weight of an ethylene unit and/or an α-olefin unit having 4 to 12 carbon atoms, the total amount of those units being 100% by weight. The component (E2) is preferably a homopolymer of propylene; a propylene-ethylene random copolymer containing 90 to 99% by weight of a propylene unit and 1 to 10% by weight of an ethylene unit, the total amount of both units being 100% by weight; a propylene-α-olefin random copolymer containing 70 to 95% by weight of a propylene unit and 5 to 30% by weight of an α-olefin unit having 4 to 12 carbon atoms, the total amount of both units being 100% by weight; or a propylene-ethylene-α-olefin random copolymer containing 80 to 95% by weight of a propylene unit, 1 to 10% by weight of an ethylene unit, and 3 to 15% by weight of an α-olefin unit having 4 to 12 carbon atoms, the total amount of those units being 100% by weight. Examples of the above-mentioned α-olefin are 1-butene, 4-methylpentene-1,1-hexene, and 1-octene. Among them, preferred is 1-butene.

The component (E2) has an intrinsic viscosity of 0.5 to 4 dl/g, and preferably 1 to 3 dl/g. The intrinsic viscosity of 4 dl/g or larger may result in such poor flowability of a thermoplastic elastomer composition produced that processability thereof may be deteriorated.

The component (E) has a molecular weight distribution of 1 to 10, which is a ratio of its weight average molecular weight (Mw) to its number average molecular weight (Mn), Mw/Mn.

The component (E) has an intrinsic viscosity of 0.5 to 4 dl/g, and preferably 0.5 to 3 dl/g. The intrinsic viscosity of larger than 3 dl/g may result in poor elastic recovery of a thermoplastic elastomer composition produced.

The component (E) can be produced according to a process known in the art. Examples thereof are (1) a process comprising the step of polymerizing monomer(s) in an inert solvent such as hexane, heptane, toluene and xylene, (2) a process comprising the step of polymerizing liquid monomer(s), namely, a bulk polymerization process, (3) a process comprising the step of polymerizing gaseous monomer(s), namely, a gas-phase polymerization process, and (4) a combined process of two or more thereof, each of which processes uses a polymerization catalyst such as a Ziegler-Natta catalyst and a metallocene catalyst.

A process for producing the component (E) comprises preferably the steps of:

(1) producing the component (E1) in an amount of 0.05 to 25% by weight; and (2) producing the component (E2) in an amount of 75 to 99.95% by weight in the presence of the component (E1); wherein the total amount of the components (E1) and (E2) is 100% by weight.

Examples of the component (F) are a thermally decomposable foaming agent such as a thermally decomposable organic foaming agent and a thermally decomposable inorganic foaming agent; water; a solvent such as a hydrocarbon and a chlorofluorocarbon; and a gas such as nitrogen, carbon dioxide, propane and butane. Among them, preferred is a thermally decomposable foaming agent.

Examples of the above-mentioned thermally decomposable foaming agent are an inorganic foaming agent such as sodium bicarbonate, sodium carbonate, ammonium bicarbonate, ammonium carbonate, and ammonium nitrite; a nitroso-compound such as N,N'-dimethyl-N,N'-dinitrosoterephthalamide and N,N'-dinitrosopentamethylenetetramine; an azo-compound such as azodicarbonamide, azobisisobutyronitrile, azocyclohexylnitrile, azodiaminobenzene, and barium azodicarboxylate; a sulfonyl hydrazide-compound such as benzenesulfonyl hydrazide, toluenesulfonyl hydrazide, p,p'-oxybis(benzenesulfonyl hydrazide), and dipheny sulfone-3,3'-disufonyl hydrazide; and an azide-compound such as calcium azide, 4,4'-diphenyl disulfonyl azide, and p-toluenesulfonyl azide.

The component (F) may be combined with a foaming auxiliary agent. Examples of the foaming auxiliary agent are a compound of a metal such as zinc, calcium, lead, iron and barium; an organic acid such as citric acid, salicylic acid, phthalic acid, and stearic acid; urea; and a derivative of urea.

The term "heating dynamically" in the present invention means melt-kneading the starting materials, namely, kneading them at an elevated temperature under a shearing stress. Examples of an apparatus for the melt-kneading are an open-type mixing roll; and a non-open-type apparatus such as a Banbury mixer, an extruder, a kneader, and a continuous mixer, which are known in the art. Among them, preferred is a non-open-type apparatus. The melt-kneading is usually carried out at 150 to 250° C. for 1 to 30 minutes.

The above-mentioned examples of an apparatus for melt-kneading are also examples of an apparatus for melt-kneading at least the thermoplastic elastomer composition with the component (F) in the present invention. Said melt-kneading promotes a function of the component (F) to produce a foamed thermoplastic elastomer composition.

Respective amounts of the components (B), (C), (D), (E) and (F) in the present invention are those per 100 parts by weight of the component (A); namely, when the component (A) is used in an amount of 100 parts by weight, 5 to 130 parts by weight of the component (B), 5 to 150 parts by weight of the component (C), 0.01 to 10 parts by weight of the component (D), 5 to 130 parts by weight of the component (E) (process-1 and process-2) or 1 to 50 parts by weight of the component (E) (process-3 and process-4), and 0.5 to 20 parts by weight of the component (F) are used, respectively. The amount of the component (A) of smaller than 100 parts by weight may result in poor elasticity of a thermoplastic elastomer composition produced. The amount of the component (A) of larger than 100 parts by weight may result in such poor flowability of a thermoplastic elastomer composition produced that appearance thereof may be deteriorated.

The amount of the component (B) of smaller than 5 parts by weight may result in such poor flowability of a thermoplastic elastomer composition produced that appearance thereof may be deteriorated. The amount of the component (B) of larger than 130 parts by weight may result in no elasticity of a thermoplastic elastomer composition produced.

The amount of the component (C) of smaller than 5 parts by weight may result in such poor flowability of a thermoplastic elastomer composition produced that appearance thereof may be deteriorated. The amount of the component (C) of larger than 150 parts by weight increases tackiness of a thermoplastic elastomer composition produced, and therefore, the thermoplastic elastomer composition is liable to attach an undesirable material such as dust on its surface, and is liable to adhere to one another.

When the amount of the component (E) is smaller than 5 parts by weight in the process-1 and the process-2, or when the amount thereof is smaller than 1 part by weight in the process-3 and the process-4, a thermoplastic elastomer composition produced may be poor in its flowability, which may result in deterioration of its appearance. When the amount of the component (E) is larger than 130 parts by weight in the process-1 and the process-2, or when the amount thereof is larger than 50 parts by weight in the process-3 and the process-4, a thermoplastic elastomer composition produced may be hard, and therefore, may not show elasticity.

The component (F) is used in an amount of 0.5 to 20 parts by weight, and preferably 1 to 10 parts by weight, per 100 parts by weight of the component (A).

Any of the components used in the present invention may be combined with an inorganic filler such as talc and calcium carbonate; an additive such as a flame retardant, a plasticizer, an antistatic agent, a heat stabilizer, a light stabilizer, an antioxidant and a mold release agent; or a pigment.

Each of a thermoplastic elastomer composition produced according to the process of the present invention, and a foamed thermoplastic elastomer composition produced according thereto can be used, for example, for an automobile part such as a bumper part, a roof molding, a side protection molding, a body panel, a side shield, a glass run channel, a skin of an instrument panel, a skin of a door, a skin of a ceiling, a weatherstrip material, a hose, and a steering wheel; an electric component such as a wire covering, a connector, and a cap plug; a footwear such as a shoe sole and a pair of sandals; leisure goods such as a swim fin, swimming goggles, a golf club grip, and a baseball bat grip; and an industrial goods such as a gasket, various gaskets and sheets for civil engineering and construction, a waterproof sheet, a garden hose, a belt, and an industrial packing.

EXAMPLE

The present invention is explained with reference to the following Examples, which do not limit the scope of the present invention.

Example 1

Step (1) of the Process-4

There were melt-kneaded with a Banbury mixer at 170 to 200° C. for 10 minutes (i) 200 parts by weight of an oil-extended rubber having a Mooney viscosity ($ML_{1+4}$ 100° C.) of 53 and a trade name of ESPRENE 670F manufactured by Sumitomo Chemical Co., Ltd., said oil-extended rubber comprising (i-1) 100 parts by weight of an ethylene-propylene-5-ethylidene-2-norbornene copolymer rubber (component (A)) containing an ethylene unit in an amount of 66.0% by weight, a propylene unit in an amount of 30.0% by weight and a 5-ethylidene-2-norbornene unit in an amount of 4.0% by weight, the total of those monomer units being 100% by weight, and (i-2) 100 parts by weight of an extender oil (component (C)) having a trade name of PW-380 manufactured by Idemitsu Kosan Co., Ltd., (ii) 35.3 parts by weight of a homopolymer of propylene (component (B)) having an intrinsic viscosity of 3.0 dl/g, a melt flow rate of 0.7 g/10 minutes measured at 230° C. under a load of 21.18 N, and a trade name of NOBLENE D101 manufactured by Sumitomo Chemical Co., Ltd., (iii) 0.24 part by weight of pentaerythrityl-tetrakis[3-(3,5-di-tert-butyl-4-hydroxy-phenyl)propionate] (antioxidant) having a trade name of IRGANOX 1010 manufactured by Ciba Specialty Chemicals K.K., (iv) 0.47 part by weight of 2-(2-hydroxy-3-tert-butyl-5-methylphenyl)-5-chlorobenzotriazole (light stabilizer) having a trade name of SUMISORB 300 manufactured by Sumitomo Chemical Co., Ltd., (v) 0.47 part by weight of a condensation product (light stabilizer) between 1-(2-hydroxyethyl)-2,2,6,6-tetramethyl-4-piperidinol and dimethyl succinate having a trade name of TINUVIN 622 manufactured by Ciba Specialty Chemicals K.K., and (vi) 0.71 part by weight of trimethylolpropane trimethacrylate (cross-linking auxiliary agent) having a trade name of HICROSS M-P manufactured by Seiko Chemical Co., Ltd., thereby producing a kneaded product. Said kneaded product was extended with a roll to make a 3 mm-thick sheet, and said sheet was pelletized with a sheet-pelletizer, thereby obtaining pellets.

There was homogeneously mixed said pellets with 1.88 parts by weight of 2,5-dimethyl-2,5-di(tert-butylperxy)hexane (component (D)) having a trade name of APO-40S manufactured by Kayaku Akzo Corcoration with a tumble mixer at a room temperature for 10 minutes, thereby producing a mixture. Said mixture was heated dynamically by extruding with a twin-screw extruder at 200±10° C., thereby producing an intermediate product.

Step (2) of the Process-4

There was mixed said intermediate product with 12.5 parts by weight of a homopolymer of propylene (component (E)) having a molecular weight distribution (Mw/Mn) of 3.8, an intrinsic viscosity of 1.98 dl/g, and a trade name of NOBLENE EL80F1 manufactured by Sumitomo Chemical Co., Ltd., said homopolymer comprising (i) a homopolymer of propylene (component (E1)) having an intrinsic viscosity of 7.9 dl/g in an amount of 10% by weight, and (ii) a homopolymer of propylene (component (E2)) having an intrinsic viscosity of 1.2 dl/g in an amount of 90% by weight, the total amount of the component (E1) and the component (E2) being 100% by weight, thereby producing a mixture. Said mixture was melt-kneaded with a uniaxial extruder at 200±10° C., thereby producing a thermoplastic elastomer composition.

Step (3) of the Process-4

There was homogeneously mixed said thermoplastic elastomer composition with 4.40 parts by weight of a foaming agent (component (F)) having a trade name of CELMIKE MB2012 manufactured by Sankyo Kasei Co., LTD, which is referred in its catalogue to as a OBSH-series foaming agent master batch, with a tumble mixer at a room temperature for 10 minutes, thereby producing a mixture. Said mixture was melt-kneaded with a 30 mm diameter-extruder having a cylinder temperature of 200° C., a screw rotation speed of 50 rpm, and a die temperature of 190° C., thereby extrusion-molding a foamed sheet having width of 25 mm and thickness of 1 mm of the thermoplastic elastomer composition. When 1 kg of said thermoplastic elastomer composition was extruded, an amount of a polymer attached to a vicinity of an outlet of the die was 54 mg. The obtained foamed sheet had an excellent appearance visually. Table 1 summarizes main starting components in view of their kinds and amounts used (part by weight), and evaluation results.

Example 2

Example 1 was repeated except that (1) an amount of the component (E) was changed to 23.5 parts by weight, and (2) an amount of the component (F) was changed to 4.21 parts by weight. Results are shown in Table 1.

Comparative Example 1

Example 1 was repeated except that the component (E) was changed to a homopolymer of propylene having an intrinsic viscosity of 3.0 dl/g, and a trade name of NOBLENE D101 manufactured by Sumitomo Chemical Co., Ltd. Results are shown in Table 1.

Comparative Example 2

Example 1 was repeated except that (1) 12.5 parts by weight of the component (E) was changed to 23.5 parts by weight of a homopolymer of propylene having an intrinsic viscosity of 3.0 dl/g, and a trade name of NOBLENE D101 manufactured by Sumitomo Chemical Co., Ltd., and (2) an amount of the component (F) was changed to 4.21 parts by weight. Results are shown in Table 1.

Example 3

Step (1) of the Process-3

The step (1) of the process-4 in Example 1 was repeated, thereby producing an intermediate product.

Step (2) of the Process-3

The step (2) of the process-4 in Example 1 was repeated, thereby producing a thermoplastic elastomer composition.

Said thermoplastic elastomer composition was extruded with a 25 mm diameter-extruder having a cylinder temperature of 210° C., a screw rotation speed of 50 rpm, and a die temperature of 230° C., thereby producing a strand of the thermoplastic elastomer composition. When 1 kg of the strand was extruded, an amount of a polymer attached to a vicinity of an outlet of the die was 2.0 mg. Results are shown in Table 2.

Comparative Example 3

Example 3 was repeated except that the component (E) was not used. Results are shown in Table 1.

Example 4

Step (1) of the Process-2

There were melt-kneaded with a Banbury mixer at 170 to 200° C. for 10 minutes (i) 200 parts by weight of an oil-extended rubber having a Mooney viscosity ($ML_{1+4}$ 100° C.) of 53 and a trade name of ESPRENE 670F manufactured by Sumitomo Chemical Co., Ltd., said oil-extended rubber comprising (i-1) 100 parts by weight of an ethylene-propylene-5-ethylidene-2-norbornene copolymer rubber (component (A)) containing an ethylene unit in an amount of 66.0% by weight, a propylene unit in an amount of 30.0% by weight and a 5-ethylidene-2-norbornene unit in an amount of 4.0% by weight, the total of those monomer units being 100% by weight, and (i-2) 100 parts by weight of an extender oil (component (C)) having a trade name of PW-380 manufactured by Idemitsu Kosan Co., Ltd., (ii) 35.3 parts by weight of a homopolymer of propylene (component (E)) having a molecular weight distribution (Mw/Mn) of 3.8, an intrinsic viscosity of 1.98 dl/g, and a trade name of NOBLENE EL80F1 manufactured by Sumitomo Chemical Co., Ltd., said homopolymer comprising (ii-1) a homopolymer of propylene (component (E1)) having an intrinsic viscosity of 7.9 dl/g in an amount of 10% by weight, and (ii-2) a homopolymer of propylene (component (E2)) having an intrinsic viscosity of 1.2 dl/g in an amount of 90% by weight, the total amount of the component (E1) and the component (E2) being 100% by weight, (iii) 0.24 part by weight of pentaerythrityl-tetrakis[3-(3,5-di-tert-butyl-4-hydroxy-phenyl)propionate] (antioxidant) having a trade name of IRGANOX 1010 manufactured by Ciba Specialty Chemicals K.K., (iv) 0.47 part by weight of 2-(2-hydroxy-3-tert-butyl-5-methylphenyl)-5-chlorobenzotriazole (light stabilizer) having a trade name of SUMISORB 300 manufactured by Sumitomo Chemical Co., Ltd., (v) 0.47 part by weight of a condensation product (light stabilizer) between 1-(2-hydroxyethyl)-2,2,6,6-tetramethyl-4-piperidinol and dimethyl succinate having a trade name of TINUVIN 622 manufactured by Ciba Specialty Chemicals K.K., and (iv) 0.94 part by weight of N,N'-m-phenylenebismaleimide (cross-linking auxiliary agent) having a trade name of SUMIFINE BM manufactured by Seiko Chemical Co., Ltd., thereby producing a kneaded product. Said kneaded product was extended with a roll to make a 3 mm-thick sheet, and said sheet was pelletized with a sheet-pelletizer, thereby obtaining pellets.

There was homogeneously mixed said pellets with 0.47 part by weight of 2,5-dimethyl-2,5-di(tert-butylperxy)hexane (component (D)) having a trade name of APO-40S manufactured by Kayaku Akzo Corcoration with a tumble mixer at a room temperature for 10 minutes, thereby producing a mixture. Said mixture was heated dynamically by extruding with a twin-screw extruder at 200±10° C., thereby producing a thermoplastic elastomer composition.

Step (2) of the Process-2

There was homogeneously mixed said thermoplastic elastomer composition with 4.42 parts by weight of a foaming agent (component (F)) having a trade name of CELMIKE MB3062 manufactured by Sankyo Kasei Co., LTD, which is referred in its catalogue to as an inorganic foaming agent master batch, with a tumble mixer at a room temperature for 10 minutes, thereby producing a mixture. Said mixture was melt-kneaded with a 30 mm diameter-extruder having a cylinder temperature of 200° C., a screw rotation speed of 50 rpm, and a die temperature of 190° C., thereby extrusion-molding a foamed sheet having width of 25 mm and thickness of 1 mm of the thermoplastic elastomer composition. When 1 kg of said thermoplastic elastomer composition was extruded, an amount of a polymer attached to a vicinity of an outlet of the die was 75 mg. The obtained foamed sheet had an excellent appearance visually. Table 3 summarizes main starting components in view of their kinds and amounts used (part by weight), and evaluation results.

Comparative Example 4

Example 4 was repeated except that the component (E) was changed to a homopolymer of propylene having a melt flow rate of 3.0 g/10 minutes measured at 230° C. under a load of 21.18 N, an intrinsic viscosity of 1.9 dl/g, and a trade name of NOBLENE H501N manufactured by Sumitomo Chemical Co., Ltd. Results are shown in Table 3.

Example 5

Step of the Process-1

There were melt-kneaded with a Banbury mixer at 170 to 200° C. for 10 minutes (i) 200 parts by weight of an oil-extended rubber having a Mooney viscosity ($ML_{1+4}$ 100° C.) of 53 and a trade name of ESPRENE 670F manufactured by Sumitomo Chemical Co., Ltd., said oil-extended rubber comprising (i-1) 100 parts by weight of an ethylene-propylene-5-ethylidene-2-norbornene copolymer rubber (component (A)) containing an ethylene unit in an amount of 66.0% by weight, a propylene unit in an amount of 30.0% by weight and a 5-ethylidene-2-norbornene unit in an amount of 4.0% by weight, the total of those monomer units being 100% by weight, and (i-2) 100 parts by weight of an extender oil (component (C)) having a trade name of PW-380 manufactured by Idemitsu Kosan Co., Ltd., (ii) 35.3 parts by weight of a homopolymer of propylene (component (E)) having a molecular weight distribution (Mw/Mn) of 3.8, an intrinsic viscosity of 1.98 dl/g, and a trade name of NOBLENE EL80F1 manufactured by Sumitomo Chemical Co., Ltd., said homopolymer comprising (ii-1) a homopolymer of propylene (component (E1)) having an intrinsic viscosity of 7.9 dl/g in an amount of 10% by weight, and (ii-2) a homopolymer of propylene (component (E2)) having an intrinsic viscosity of 1.2 dl/g in an amount of 90% by weight, the total amount of the component (E1) and the component (E2) being 100% by weight, (iii) 0.25 part by weight of pentaerythrityl-tetrakis[3-(3,5-di-tert-butyl-4-hydroxy-phenyl)propionate] (antioxidant) having a trade name of IRGANOX 1010 manufactured by Ciba Specialty Chemicals K.K., (iv) 0.50 part by weight of 2-(2-hydroxy-3-tert-butyl-5-methylphenyl)-5-chlorobenzotriazole (light stabilizer) having a trade name of SUMISORB 300 manufactured by Sumitomo Chemical Co., Ltd., (v) 0.50 part by weight of a condensation product (light stabilizer) between 1-(2-hydroxyethyl)-2,2,6,6-tetramethyl-4-piperidinol and dimethyl succinate having a trade name of TINUVIN 622 manufactured by Ciba Specialty Chemicals K.K., and (iv) 1.0 part by weight of N,N'-m-phenylenebismaleimide (cross-linking auxiliary agent) having a trade name of SUMIFINE BM manufactured by Seiko Chemical Co., Ltd., thereby producing a kneaded product. Said kneaded product was extended with a roll to make a 3 mm-thick sheet, and said sheet was pelletized with a sheet-pelletizer, thereby obtaining pellets.

There was homogeneously mixed said pellets with 0.50 part by weight of 2,5-dimethyl-2,5-di(tert-butylperxy)hexane (component (D)) having a trade name of APO-40S manufactured by Kayaku Akzo Corcoration with a tumble mixer at a room temperature for 10 minutes, thereby producing a mixture. Said mixture was heated dynamically by extruding with a twin-screw extruder at 200±10° C., thereby producing a thermoplastic elastomer composition.

Said thermoplastic elastomer composition was extruded with a 25 mm diameter-extruder having a cylinder temperature of 210° C., a screw rotation speed of 50 rpm, and a die temperature of 230° C., thereby obtaining an extruded strand. When 1 kg of the strand was extruded, an amount of a polymer attached to a vicinity of an outlet of the die was 1.0 mg.

Results are shown in Table 4.

Comparative Example 5

Example 5 was repeated except that the component (E) was changed to a homopolymer of propylene having an intrinsic viscosity of 3.0 dl/g, and a trade name of NOBLENE D101 manufactured by Sumitomo Chemical Co., Ltd. Results are shown in Table 4.

TABLE 1

| | Example | | Comparative Example | |
|---|---|---|---|---|
| | 1 | 2 | 1 | 2 |
| Component (A): | | | | |
| C'$_2$-C'$_3$-5-ethylidene-2-norbornene copolymer rubber (note 1) | 100 | 100 | 100 | 100 |
| Component (B): | | | | |
| NOBLENE D101 | 35.3 | 35.3 | 35.3 | 35.7 |
| Component (C): | | | | |
| PW-380 (note 1) | 100 | 100 | 100 | 100 |
| Component (D): | | | | |
| APO-40S | 1.88 | 1.88 | 1.88 | 1.88 |
| Component (E): | | | | |
| NOBLENE EL80F1 | 12.5 | 23.5 | | |
| NOBLENE D101 | | | 12.5 | 23.5 |
| Component (F): | | | | |
| CELMIKE MB2012 | 4.71 | 4.71 | 4.71 | 4.71 |
| Evaluation: | | | | |
| Amount of polymer deposited (mg) | 54 | 48 | 832 | 1426 |
| Appearance | excellent | excellent | bad | bad |

TABLE 2

| | Example 3 | Comparative Example 3 |
|---|---|---|
| Component (A): | | |
| C'$_2$-C'$_3$-5-ethylidene-2-norbornene copolymer rubber (note 1) | 100 | 100 |

TABLE 2-continued

|  | Example 3 | Comparative Example 3 |
|---|---|---|
| Component (B): | | |
| NOBLENE D101 | 35.3 | 35.3 |
| Component (C): | | |
| PW-380 (note 1) | 100 | 100 |
| Component (D): | | |
| APO-40S | 1.88 | 1.88 |
| Component (E): | | |
| NOBLENE EL80F1 | 12.5 | |
| NOBLENE D101 | | |
| Component (F): | | |
| CELMIKE MB2012 | | |
| Evaluation: | | |
| Amount of polymer deposited (mg) | 2.0 | 35 |

TABLE 3

|  | Example 4 | Comparative Example 4 |
|---|---|---|
| Component (A): | | |
| C'$_2$-C'$_3$-5-ethylidene-2-norbornene copolymer rubber (note 1) | 100 | 100 |
| Component (B): | | |
| NOBLENE D101 | | 35.3 |
| Component (C): | | |
| PW-380 (note 1) | 100 | 100 |
| Component (D): | | |
| APO-40S | 0.47 | 0.47 |
| Component (E): | | |
| NOBLENE EL80F1 | 35.3 | |
| NOBLENE H501N | | 35.3 |
| Component (F): | | |
| CELMIKE MB2012 | 4.42 | 4.42 |
| Evaluation: | | |
| Amount of polymer deposited (mg) | 75 | 122 |
| Appearance | excellent | bad |

TABLE 4

|  | Example 5 | Comparative Example 5 |
|---|---|---|
| Component (A): | | |
| C'$_2$-C'$_3$-5-ethylidene-2-norbornene copolymer rubber (note 1) | 100 | 100 |
| Component (B): | | |
| NOBLENE D101 | | |
| Component (C): | | |
| PW-380 (note 1) | 100 | 100 |
| Component (D): | | |
| APO-40S | 0.50 | 0.50 |
| Component (E): | | |
| NOBLENE EL80F1 | 50.0 | |
| NOBLENE D101 | | 50.0 |
| Component (F): | | |
| CELMIKE MB2012 | | |
| Evaluation: | | |
| Amount of polymer deposited (mg) | 1.0 | 15.0 |

Note-1:
The components (A) and (C) are combined with each other, and contained in an oil-extended rubber, ESPRENE 670F.

The invention claimed is:

1. A process for producing a foamed thermoplastic elastomer composition, which comprises the steps of:
   (1) heating dynamically at least the following components (A), (B), (C) and (D), thereby producing an intermediate product:
   (A) 100 parts by weight of an ethylene-α-olefin random copolymer rubber, which contains at least an ethylene unit and an α-olefin unit having 3 to 10 carbon atoms, and has hardness-A defined in JIS K-6253 of 98 or smaller;
   (B) 5 to 130 parts by weight of a propylene homopolymer, or a random or block copolymer of propylene with ethylene and/or an α-olefin having 4 to 10 carbon atoms, said homopolymer and said copolymer containing 50 to 100% by weight of a propylene unit, wherein the total amount of all units contained therein is 100% by weight;
   (C) 5 to 150 parts by weight of a mineral oil softener; and
   (D) 0.01 to 20 parts by weight of a crosslinking agent;
   (2) melt-kneading at least said intermediate product with 1 to 50 parts by weight of a polypropylene resin (E), which contains 0.05 to 25% by weight of the following first propylene polymer component (E1) and 75 to 99.95% by weight of the following second propylene polymer component (E2), and has an intrinsic viscosity of 0.5 to 4 dl/g and a molecular weight distribution of 1 to 10, wherein the total amount of the first propylene polymer component (E1) and the second propylene polymer component (E2) is 100% by weight:
   (E1) a first propylene polymer component which has an intrinsic viscosity of 7 to 10 dl/g; and
   (E2) a second propylene polymer component which has an intrinsic viscosity of 0.5 to 4 dl/g;
   wherein each of the component (E1) and the component (E2) is a homopolymer of propylene;
   thereby producing a thermoplastic elastomer composition; and
   (3) melt-kneading at least said thermoplastic elastomer composition with (F) 0.5 to 20 parts by weight of a foaming agent.

2. The process for producing a thermoplastic elastomer composition according to claim 1, wherein the component (A) is an ethylene-propylene copolymer rubber or an ethylene-propylene-5-ethylidene-2-norbornene copolymer rubber.

3. The process for producing a thermoplastic elastomer composition according to claim 1, wherein the component (B) is a homopolymer of propylene, an ethylene-propylene copolymer or a propylene-1-butene copolymer.

4. The process for producing a thermoplastic elastomer composition according to claim 1, wherein the component (D) is an organic peroxide.

5. The process for producing a thermoplastic elastomer composition according to claim 1, wherein the component (E) is produced according to a process comprising the steps of (i) producing the component (E1), and (ii) producing the component (E2) in the presence of the component (E1).

6. The process for producing a thermoplastic elastomer composition according to claim 1, wherein the component (C) is paraffinic mineral oil.

* * * * *